(12) United States Patent
Webb

(10) Patent No.: US 7,073,976 B1
(45) Date of Patent: Jul. 11, 2006

(54) UNDER-DISPENSER CONTAINMENT SYSTEM

(76) Inventor: Michael C. Webb, 6208 Barclay Woods Ct., Raleigh, NC (US) 27614

( * ) Notice: Subject to any disclaimer, the term of this patent is extended or adjusted under 35 U.S.C. 154(b) by 0 days.

(21) Appl. No.: 11/044,214

(22) Filed: Jan. 28, 2005

(51) Int. Cl.
*B65G 5/00* (2006.01)
(52) U.S. Cl. .......................................... 405/52; 405/53
(58) Field of Classification Search ............. 405/52–55
See application file for complete search history.

(56) References Cited

U.S. PATENT DOCUMENTS

| | | | | |
|---|---|---|---|---|
| 5,099,894 A | * | 3/1992 | Mozeley, Jr. ............... | 220/484 |
| 5,100,024 A | * | 3/1992 | Bravo .......................... | 405/54 |
| 5,398,976 A | * | 3/1995 | Webb .......................... | 285/93 |
| 5,407,300 A | * | 4/1995 | Guindon et al. .............. | 405/53 |
| 5,819,975 A | * | 10/1998 | Pendleton et al. ............ | 405/52 |
| 5,833,392 A | * | 11/1998 | Youngs ....................... | 405/53 |
| 5,988,944 A | * | 11/1999 | Youngs ....................... | 405/52 |
| 6,823,886 B1 | * | 11/2004 | Bravo et al. ................ | 137/312 |

* cited by examiner

*Primary Examiner*—Frederick L. Lagman
(74) *Attorney, Agent, or Firm*—Drinker Biddle & Reath LLP

(57) ABSTRACT

A type of under-dispenser containment system that is easier to install, inspect and repair primary and secondary piping connections located underneath an above ground dispensing unit. This shallow type containment chamber has angled sidewalls that permit underground pipeline connections to be made directly to specially designed shear valves without the need for a riser pipe assembly.

19 Claims, 6 Drawing Sheets

UNDER-DISPENSER CONTAINMENT SYSTEM

FIELD OF THE INVENTION

The present invention relates to under-dispenser containment systems in environmentally safe underground piping systems typically installed at service stations. More particularly, the invention relates to a "dispenser sump" that secondarily contains pipe couplings and valves.

BACKGROUND OF THE INVENTION

In response to increasing environmental regulations of underground storage and pipe delivery systems of hazardous liquids such as, motor fuels environmental regulators have been seeking safer and more reliable tank, piping and sump containment systems. In 1988 the US Congress passed the "Clean Water Act" that contained legislation that mandated that fuel handling facilities, like service stations insure that the fuel that was stored in underground storage tanks (UST's) and supplied via underground piping to the fuel dispensers could not leak into the environment.

As a result of this federal legislation and other state laws governing the environmental safety of UST's and their associated piping systems, manufacturers introduced a variety of double-wall tank and piping systems and electronic leak detection systems.

In the 1960's non-metallic fiberglass tanks and piping was introduced to replace unprotected steel tanks and piping that would corrode over time. In the 1980's double-wall tanks and piping with leak detection were introduced to the market for added protection. In the 1990's double-wall flexible underground piping systems were introduced in an effort to minimize the number of piping joints and pipe cracking within a pipe distribution system.

The major difference between flexible and rigid underground piping systems was whether the flexible piping was available on a long continuous roll or reel. Rigid steel or fiberglass piping was available in bundles of straight lengths. Used in conjunction with "tank sumps" located on top of the tanks and "dispenser sumps" located under the dispensers, all flexible piping joints could be secondarily contained within these sumps. Because flexible piping can turn corners and comes in long continuous lengths it does not require pipe-to-pipe connectors or directional fittings in order to route the piping from one containment sump to another.

Manufacturers of flexible piping systems boast that their piping systems have all piping joints contained inside a secondary containment sump located either on top of the tank or under each fuel dispenser. This is important because over 90% of piping leaks occur at the piping joints and with flexible piping systems all piping joints can be inspected and accessed from above ground without the need for excavation. Another significant advantage of flexible piping systems is that they can be installed inside a larger chase (duct or conduit) that allows a flexible pipe section to be removed and replaced without the need for excavation. These flexible piping systems would be similar to my U.S. Pat. Nos. 4,971,477, 5,263,794, 5,297,896 and 5,527,130.

Over the years there have been significant improvements in underground double-wall UST's and piping systems due to increasing environmental regulations and tighter testing standards, such as UL, SEN and Kiwa testing standards. One component of underground fuel storage and delivery systems that is currently under investigation for improved design are under-dispenser containers, called "dispenser sumps" and pump containment sumps, called "tank sumps".

Containment sumps installed today are typically large hollow containers made of either rotationally molded polyethylene or fiberglass. Tank sumps are typically large enough (36" to 48" in diameter) to allow installers sufficient room to install the dispensing pumps and various types of plumbing assemblies and piping connections within them. These tank sumps would be similar to those described in my U.S. Pat. D309,308. Dispenser sumps on the other hand are deep containers with a narrow top opening that makes access difficult for installing a multitude of primary and secondary piping plumbing connections and riser assemblies. The limited access into such deep containers (30" to 48" deep) makes installation and future repair very difficult and time consuming. These deep dispenser sumps would be similar to those dispenser sumps described in my U.S. Pat. Nos. 4,971,477, 5,263,794, 5,297,896 and 5,527,130.

Prior to these deep dispenser sumps there existed shallow dispenser pans. The problems associated with these dispenser pans was that not all plumbing connections could be contained within this shallow container. This primary drawback led to the virtual extinction of shallow dispenser pans by the middle of the 1990's. The difference in terminology ("pan" vs. "sump") is that not all of the piping connections are contained within a dispenser pan whereas they are in a dispenser sump.

There are a number of other problems associated with deep, flat, vertical sided containers like that of today's dispenser sumps, besides limited accessibility. Conventional dispenser sumps are sufficiently deep enough to allow the piping to enter the container through the vertical sidewall horizontally. The piping makes connection inside the sump with either a tee or elbow fitting and is routed upward to a shear valve by means of a steel riser pipe or flexible connector. Dispenser sumps also require large flat sidewalls to effectively install a multitude of pipe entry seals at different elevations. The combination of a deep container having large flat side walls can have problem with concaving (bowing inward or outward), collapse, or cracking due to ground pressures caused by high ground water conditions and/or being installed in fluid backfill materials like sand.

Leaking pipe entry seals, deformed and cracked sidewalls have led some state environmental regulators to consider and/or mandate monitored double-wall containment sumps and their associated pipe entries.

It is the significant depth of these conventional deep dispenser sumps that causes so many problems. The concaving of the large flat sidewalls can damage pipe entry seals, cause cracks in the sump container wall or even cause damage to the fuel delivery piping contained within. To repair any damage to these sumps is very difficult and time consuming because of the limited access. These deep dispenser sumps can also contain a large volume of leaking fuel before the leaks are detected that could cause a significant safety and environmental risk.

SUMMARY OF THE INVENTION

An under-dispenser containment sump comprising a chamber for disposition beneath a fuel dispenser, said chamber having an open upper end and a closed bottom wherein the open upper end is joined to said fuel dispenser at its base; said chamber further comprising one or more angular side walls, said one or more angular side walls comprising at least first and second segments between said closed bottom and said upper end, neither of which segments is perpendicular to said closed bottom, said first segment forming an oblique angle with reference to the bottom of the chamber, said angle being more than ninety degrees with reference to the bottom such that said first segment extends upward and outward from said bottom, said second segment extending upward and inward at an angle from said first segment, returning inward toward a vertical axis through the chamber at its geometric center.

This invention is part of an overall piping system using the invention. It is an underground piping system which connects the dispensing pump of an underground storage tank to a plurality of above ground dispensing units, comprising: an originating chamber which is installed around the dispensing pump located at the beginning of a underground pipeline and having at least one opening in its side walls for pipe entry; one or more junction chambers installed under one or more above ground dispensing units supplied by the underground pipeline, providing a means of surface access, secondary containment, and leak collection, and having at least one opening in its side walls for a underground pipe entry and another opening for a underground pipe exit; sealing devices providing a means for sealing all pipe entry and exit openings in the side walls of the chambers to the exterior wall of the underground pipe, whereby the pipe entry through the chambers is liquid tight; wherein said one or more junction chambers comprise: an open upper end and a closed bottom wherein the open upper end is joined to said fuel dispenser at its base; said chamber further comprising one or more angular side walls, said one or more angular side walls comprising at least first and second segments between said closed bottom and said upper end, neither of which segments is perpendicular to said closed bottom, said first segment forming an oblique angle with reference to the bottom of the chamber, said angle being more than ninety degrees with reference to the bottom such that said first segment extends upward and outward from said bottom; said second segment extending upward and inward at an angle from said first segment, returning inward toward a vertical axis through the chamber at its geometric center.

BRIEF DESCRIPTION OF THE DRAWINGS

These and other objects of the present invention of the various details of the operation and construction thereof are hereinafter more fully set forth with reference to the accompanying drawings, wherein.

DESCRIPTION OF THE INVENTION

Figure 1:
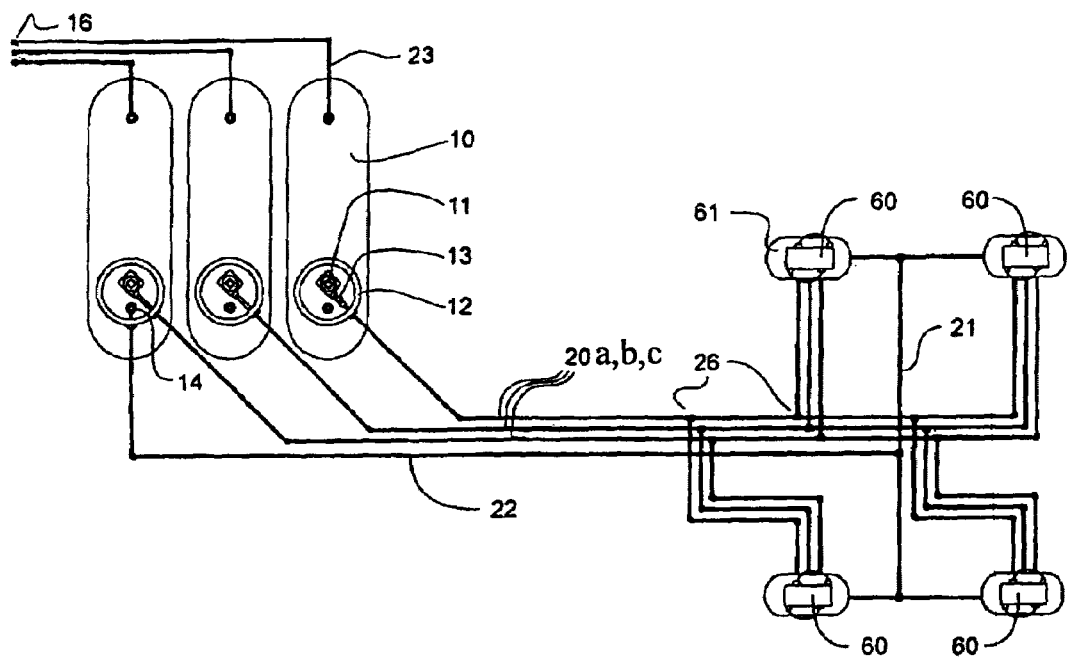
FIG. 1 is a diagrammatic plan view of a fuel dispensing piping system that is routed in the branching method.

Referring to FIG. 1, a type of underground fuel storage and dispensing system that includes an underground storage tank 10 equipped with an originating chamber 12 that contains a dispensing pump 11. The dispensing pump 11 is connected by an originating plumbing assembly 13 that provides a means of product shut-off and transition. The originating plumbing assembly 13 is connected to one or more above ground dispensing units 60 by an underground pipeline 20, that has a multitude of piping segments 20a, 20b and 20c. The piping segments 20a, 20b and 20c are connected together by pipefittings 26, mostly installed outside containment sumps, in a branch routing method. This method of pipe routing is typical with rigid piping systems that terminate under each above-ground dispensing unit 60.

Also illustrated is another type of pipeline, called vapor recovery piping 22, that is used to transfer hydrocarbon vapors from the above ground dispensing units 60 to the vapor recovery fitting 14, usually located within the originating chamber 12 on top of the underground storage tank 10. Also tank vent piping 23 is shown that interconnects the underground storage tank 10 with a vent stack 16.

Figure 2:
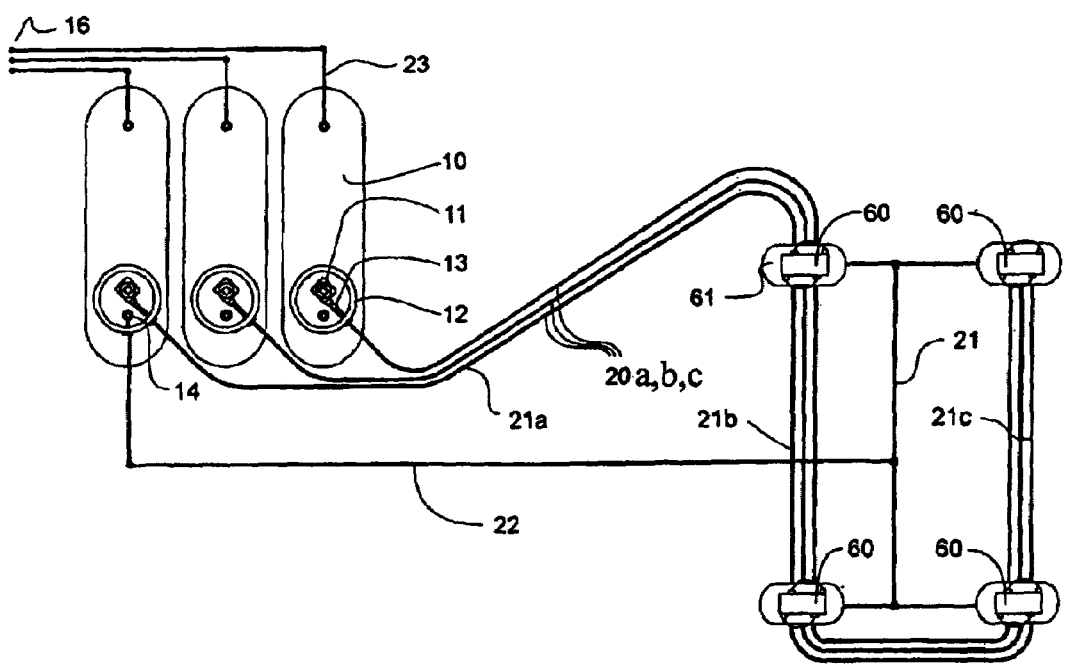
FIG. 2 is a diagrammatic plan view of a fuel dispensing piping system that is routed in the series method.

Referring to FIG. 2, a type of underground fuel storage and dispensing system that includes an underground storage tank 10 equipped with an originating chamber 12 that contains a dispensing pump 11 is illustrated. The dispensing pump 11 is connected by an originating plumbing assembly 13 that provides a means of product shut-off and transition. The originating plumbing assembly 13 is connected to one or more above ground dispensing units 60 by an underground pipeline 20, that has a multitude of piping segments 20a, 20b and 20c. The piping segments 20a, 20b and 20c are connected together by pipefittings 26 (not shown), mostly installed inside under-dispenser containment chambers, in a series routing method. This method of pipe routing is typical with flexible piping systems that run directly from one above ground dispensing unit 60 to the next.

Also illustrated is another type of pipeline, called vapor recovery piping 22, that is used to transfer hydrocarbon vapors from the above ground dispensing units 60 to the vapor recovery fitting 14, usually located within the originating chamber 12 on top of the underground storage tank 10. Also tank vent piping 23 is shown that interconnect the underground storage tank 10 with a vent stack 16.

Figure 3:
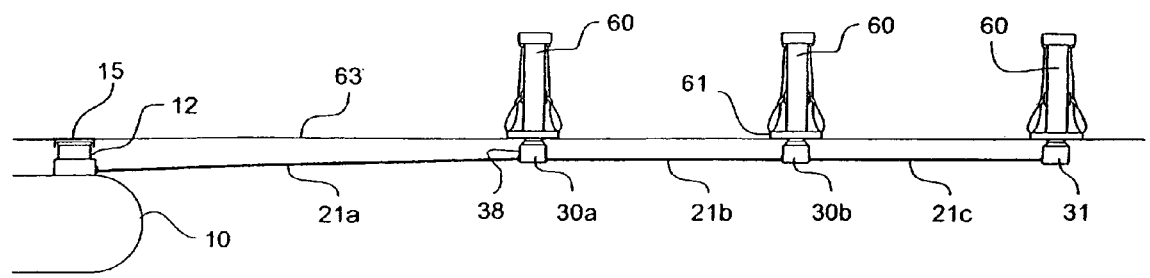
FIG. 3 is a side view of a fuel dispensing piping system, as installed today, that is routed in the series method.

FIG. 3 shows another view of how a conventional fuel delivery piping system is typically installed today under the driving surface 63. The underground storage tank 10 is equipped with an originating chamber 12 for the secondary containment of the dispensing pump 11, the originating plumbing assembly 13 and other plumbing and piping connections. A manhole cover 15 is installed directly above the originating chamber 12 to provide a means of access from the driving surface 63.

In this series routing method the first fuel delivery piping section 21a exits from the originating chamber 12 and runs to the first deep junction chamber 30a installed underneath an above ground dispensing unit 60. The next fuel delivery piping section 21b, exits out of the first deep junction chamber 30a and then runs to the next deep junction chamber 30b in the series. The last fuel delivery piping section 21c in the series, exits out of deep junction chamber 30b and then runs to deep terminating chamber 31, where it terminates. It is important to note that that all fuel delivery piping sections 21a, 21b and 21c that either enter or exit out of the deep dispenser chambers 30 are achieved on a generally horizontal plane that is dictated by their vertical sidewall 38.

Figure 4:
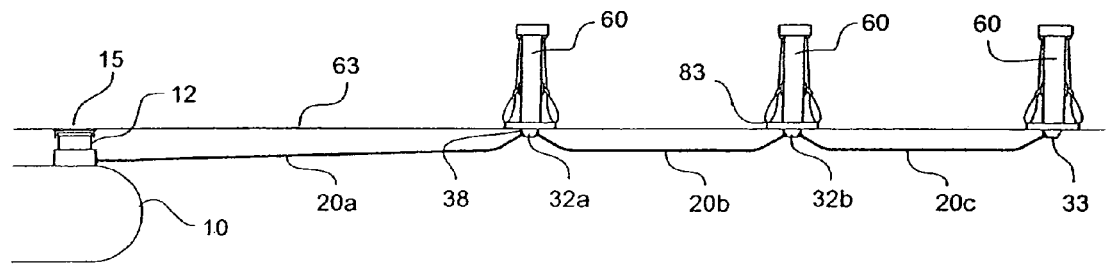
FIG. 4 is a side view of a fuel dispensing piping system, as described in the invention that is routed in the series method.

FIG. 4 shows how a fuel delivery piping systems of this invention would be installed under the driving surface 63. The underground storage tank 10 is equipped with an originating chamber 12 for the secondary containment of the dispensing pump 11, the originating plumbing assembly 13 and other plumbing and piping connections. A manhole cover 15 is installed directly above the originating chamber 12 to provide a means of access from the driving surface 63.

In this series routing method the first fuel delivery piping section 20a exits from the originating chamber 12 and runs to the first shallow junction chamber 32a installed underneath an above ground dispensing unit 60. The next fuel delivery piping section 20b, exits out of the first shallow junction chamber 32a and then runs to the next deep junction chamber 32b in the series. The last fuel delivery piping section 20c in the series, exits out of shallow junction chamber 32b and then runs to shallow terminating chamber 33, where it terminates. It is important to note that that all fuel delivery piping sections 20a, 20b and 20c that either enter or exit out of the shallow dispenser chambers 32 are achieved at a substantial angle that is dictated by their angled sidewall 38.

Figure 5:
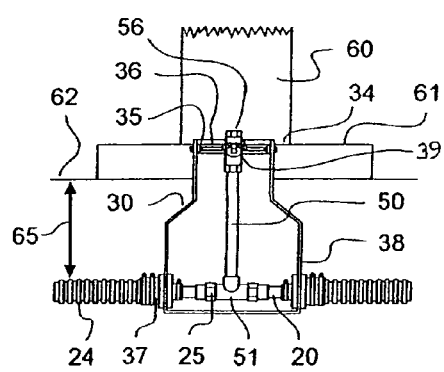
FIG. 5 is a side cut-away view of a typical deep dispenser sump with it associated plumbing connections and seals.

FIG. 5 illustrates the typical primary and secondary piping and plumbing connections that are attached or contained in a conventional deep junction chamber 30 that is installed under an above ground dispensing unit 60. A deep junction chamber 30 is a deep container (30" to 36" in depth) that contains a riser pipe assembly that can include a standard shear valve 39 connected to the top of a riser pipe 50 that could be of a rigid or flexible construction. It could also include a riser fitting 51 like the tee fitting (not shown) illustrated that would be used inside a deep junction chamber 30 application, or an elbow fitting that would be used under a deep terminating chamber 31. The riser pipe assembly would be connected to the underground pipeline 20 by connecting a pipe coupling 25 to the riser fitting 51. In this application the underground pipeline 20, the pipe coupling 25 and the riser fitting 51 could be of single or double-wall construction.

This illustration also shows chase piping 24 piping that is connected and sealed to the deep junction chamber 30 by means a of pipe sealing device 37. The chase piping 24 is typically installed with flexible underground pipelines 20 that allow the future removal and replacement of a damaged flexible pipeline section without the need for excavation. Because deep junction chambers 30 can only accommodate horizontal pipe entries they have a deep design to keep the underground pipeline 20 at a safe burial depth 65, usually specified by the manufacturer of the piping (typically a minimum of 12" to 24" below driving surface 62). In addition to the pipeline burial depth 65, the height of the raised island 61 (6" to 8" in height) and the outside diameter of the pipe sealing devices 37 must be compensated for when designing the overall height of a deep junction chamber 30. It is this significant depth of the deep junction chamber 30 that makes installation, inspection and repair of pipe sealing devices 37, pipe couplings 25, riser pipe assemblies 49, difficult and time consuming.

Also illustrated is the chamber mounting frame 34 that is used to secure the deep junction chamber 30 to the raised island 61 and for secured attachment of the above ground dispensing unit 60. Inside the upper end of the deep junction chamber 30 is a side strut 35 and a stabilizer bar 36 used to secure the standard shear valve 39.

Figure 6:
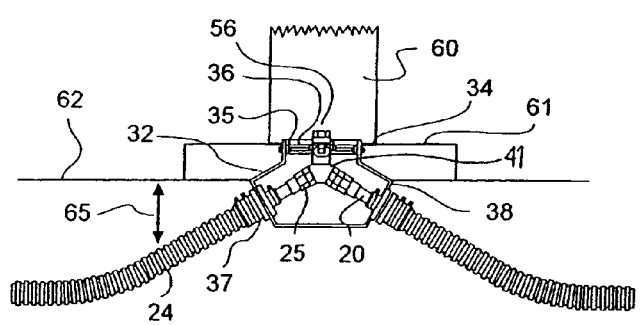
FIG. 6 is a side cut-away view of a shallow dispenser sump, as described in the invention, with it associated plumbing connections and seals.
Figure 7:
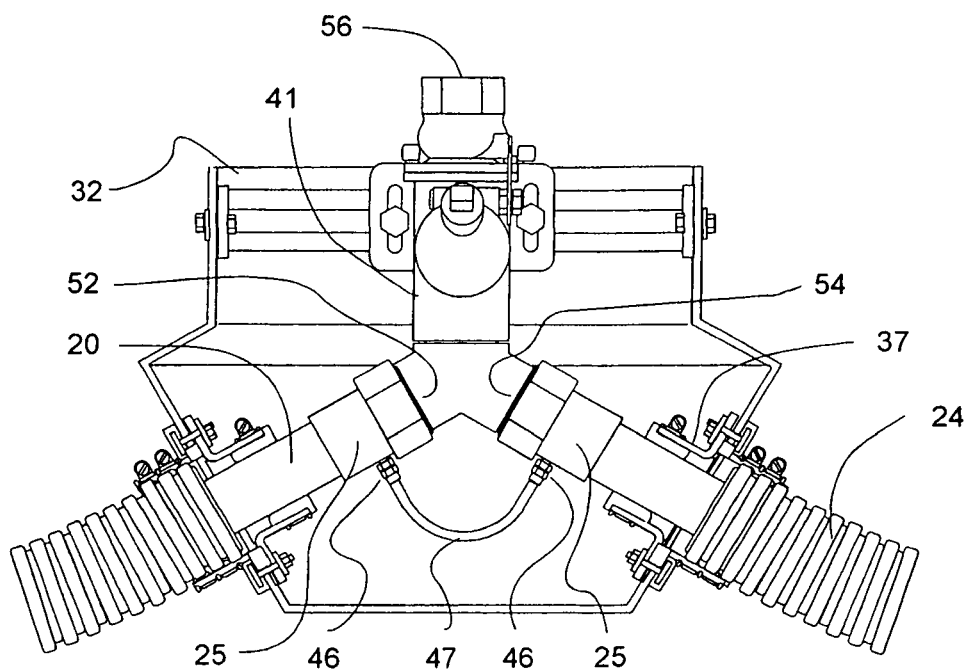
FIG. 7 is an enlarged cut-away view of a shallow dispenser sump illustrating a single-wall Y product shear valve plumbing connection.

FIG. 6 and FIG. 7 illustrate the primary and secondary piping and plumbing connection of the invention that would be found in a shallow junction chamber 32 that is installed under an above ground dispensing unit 60. A shallow junction chamber 32 is a shallow container (12" to 18" in depth) that would contain one or more angled shear valves, that could be a Y shear valve 41 (as illustrated) or an elbow shear valve 42 (FIG. 9), in place of the riser pipe assembly that is typically installed inside the deep junction chamber 30 illustrated in FIG. 5.

The shallow junction chamber 32 has angled sidewalls 38 that correspond with the angle of the angled inlet port 52 and angled outlet port 54 of the Y shear valve 41 illustrated. This allows the underground pipeline 20 with attached pipe coupling 25 to connect to directly the Y shear valve 41 without the need for a riser pipe assembly illustrated in FIG. 5. In this application the underground pipline 20, the pipe coupling 25 and the Y shear valve 41 could be either a single or double-wall construction.

These illustrations also show chase piping 24 connected and sealed to the shallow junction chamber 32 by means of a pipe sealing device 37. The chase piping 24 is typically installed with flexible underground pipelines 20 that allow the future removal and replacement of a damaged flexible underground pipeline 20 sections without the need for excavation. Because shallow junction chambers 32 accommodate angled pipe entries they can have a shallow design and still keep the underground pipeline at a safe burial depth 65 specified by the manufacturer of the piping (typically a minimum of 12" to 24" below driving surface 662). The shallowness of the shallow junction chamber 32 makes the installation, inspection and repair of pipe sealing devices 37, pipe couplings 25, Y shear valves 41 fast and easy.

Also illustrated is the chamber mounting frame 34 that is used to secure the shallow junction chamber 32 to the raised island 62 and for secure attachment of the above ground dispensing unit 60. Inside the upper end of the shallow dispenser sump is a side strut 35 and a stabilizer bar 36 used to secure the Y shear valve 41.

FIG. 7 illustrates the installation of a single-wall Y shear valve 41 connected to two sections of double-wall underground pipeline 20 sections that are fitted on each end with a double-wall pipe coupling 25. The entering underground pipeline 20 section makes connection with the angled inlet port 52 and the exiting underground pipeline section 20 makes connection with the angled outlet port 54 of the Y shear valve 41. In this illustration the interstitial test ports 46 of each double-wall pipe coupling 25 are connected together by means of an interstitial connector tube 47 assembly. This permits the interstitial space of a double-wall underground pipeline 20 to maintain continuity by detouring around the single-wall Y shear valve 41. Also illustrated is the vertical discharge port 56 of the Y shear valve 41 that connects to the fuel inlet of the above ground dispensing unit 60 (not shown).

Figure 8:
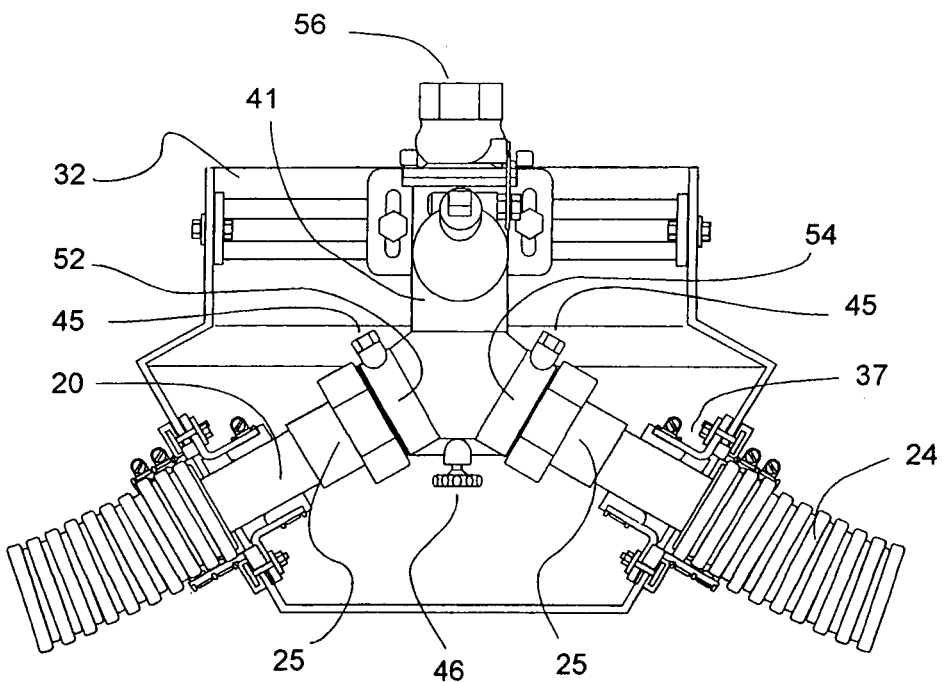
FIG. 8 is an enlarged cut-away view of a shallow dispenser sump illustrating a double-wall Y product shear valve plumbing connection.

FIG. 8 illustrates the installation of a double-wall Y shear valve 41 connected to two sections of double-wall underground pipeline 20 sections that are fitted on each end with a double-wall pipe coupling 25. The entering underground pipeline 20 section makes connection with the angled inlet port 52 and the exiting underground pipeline section 20 makes connection with the angled outlet port 54 of the Y shear valve 41. In this illustration the interstitial test ports 45 of each double-wall pipe coupling 25 are only used for integrity testing of the interstitial space of the double-wall underground pipeline 20. This permits the interstitial space of a double-wall underground pipeline 20 to maintain continuity by passing through the double-wall Y shear valve 41. The double-wall Y shear valve 41 is shown to have an interstitial isolation valve 46 to isolate a pipe section during integrity testing. Also illustrated is the vertical discharge port 56 of the Y shear valve 41 that connects to the fuel inlet of the above ground dispensing unit 60.

Figure 9:
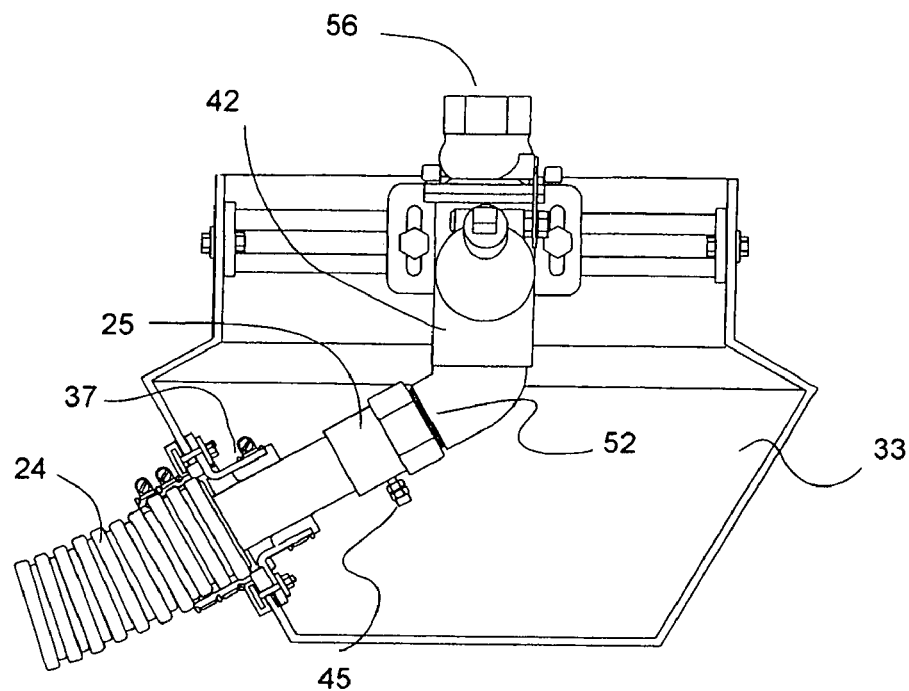
FIG. 9 is an enlarged cut-away view of a shallow dispenser sump illustrating a single-wall elbow product shear valve plumbing connection.

FIG. 9 illustrates the installation of a single-wall elbow shear valve 42 connected to one double-wall underground pipeline 20 section that is fitted on its end with a double-wall pipe coupling 25. The entering underground pipeline 20 section makes connection with the angled inlet port 52 of the elbow shear valve 42. In this illustration the interstitial test port 45 is used for integrity testing. Also illustrated is the vertical discharge port 56 of the elbow shear valve 42 that connects to the fuel inlet of the above ground dispensing unit 60.

Figure 10:
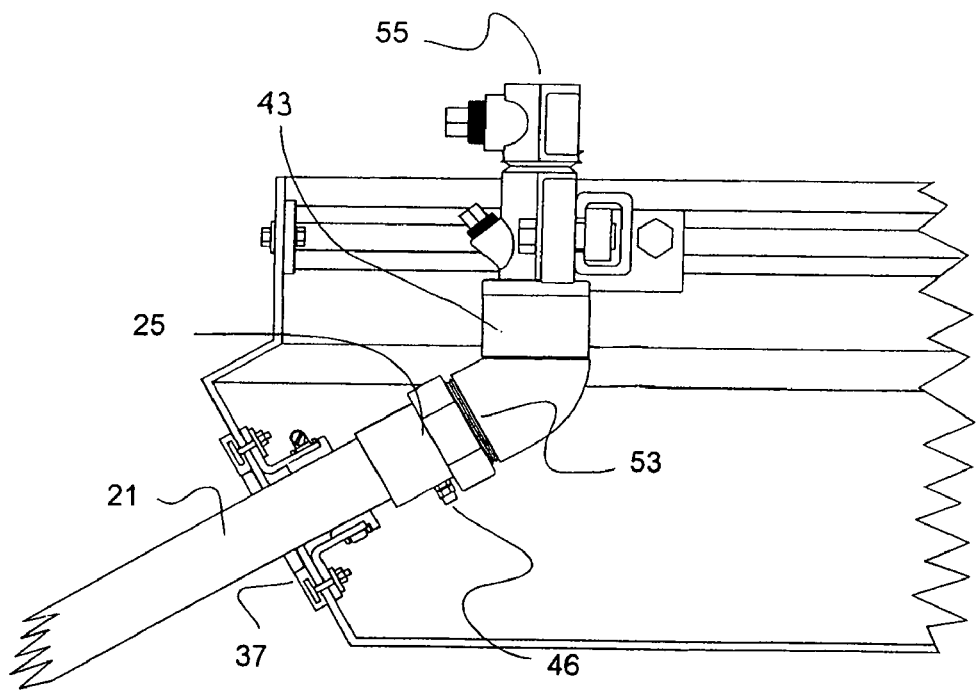
FIG. 10 is an enlarged cut-away view of a shallow dispenser sump illustrating a single-wall elbow vapor shear valve plumbing connection.

FIG. 10 illustrates the installation of a single-wall angled vapor valve 43 connected at the angled discharge port 53 to a section of double-wall vapor recovery piping 21 that is fitted its end with a double-wall pipe coupling 25. The double-wall pipe coupling 25 has an interstitial test port 46 for integrity testing of the double-wall vapor recovery piping 21. One or more angled vapor valves 43 would typically be installed in all shallow junction chambers 32, as illustrated in FIG. 8 and shallow terminating chambers 31, as illustrated in FIG. 9, when there is vapor recover piping 21 installed. Also illustrated is the vertical inlet port 55 that connects to the vapor recover line contained within the of above ground dispensing unit 60.

Figure 11:
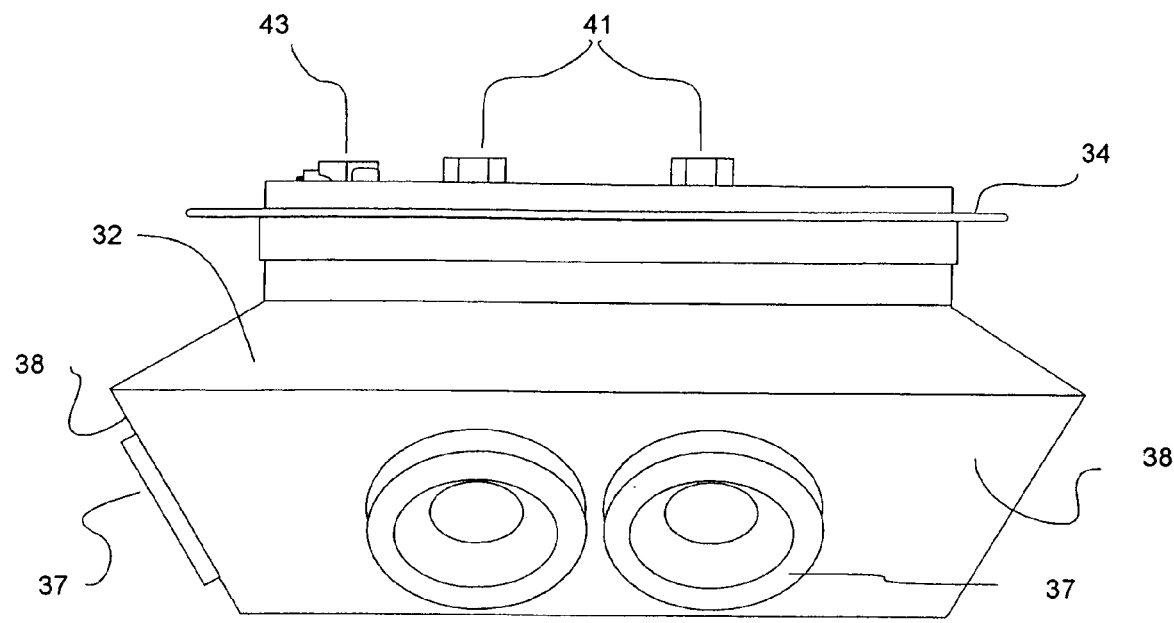
FIG. 11 is a side perspective view of a typical shallow dispenser sump with the pipe entry seals and shear valves installed.
Figure 12:
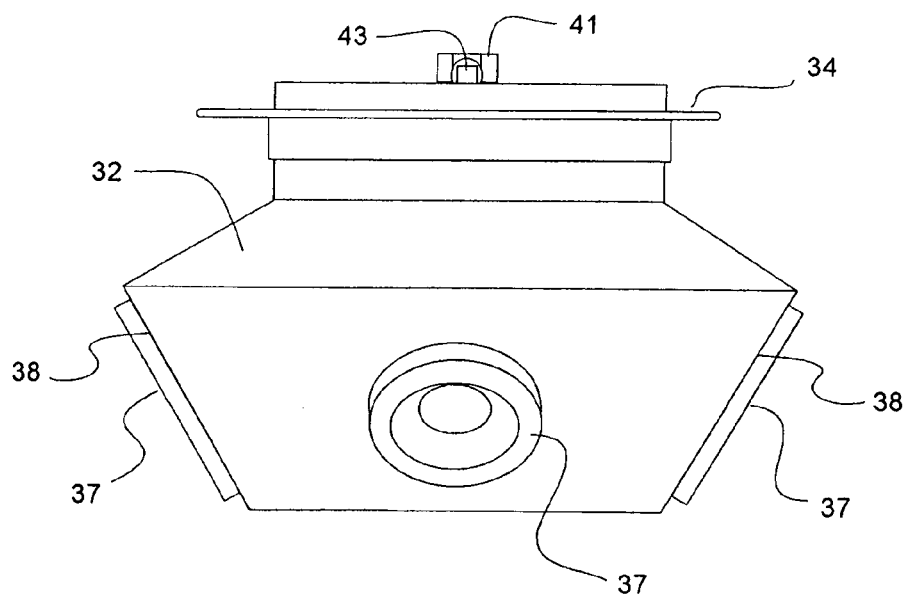
FIG. 12 is an end perspective view of a typical shallow dispenser sump with the pipe entry seals and shear valves installed.

FIGS. 11 and 12 illustrate the perspective side and end view of the shallow junction chamber 32. This chamber has angled sidewalls 38 to correspond with the angle of the angled inlet ports 52 and angled outlet ports 54 of a Y shear valve 41 and angled discharge ports 53 of angled vapor valve 43, installed within. Shown are the pipe sealing devices 37 that would connect and seal the underground pipeline 20 and vapor recovery piping 21 to the sidewalls 38 of the shallow junction chamber 32. Also illustrated is the chamber mounting frame 34.

Figure 13:
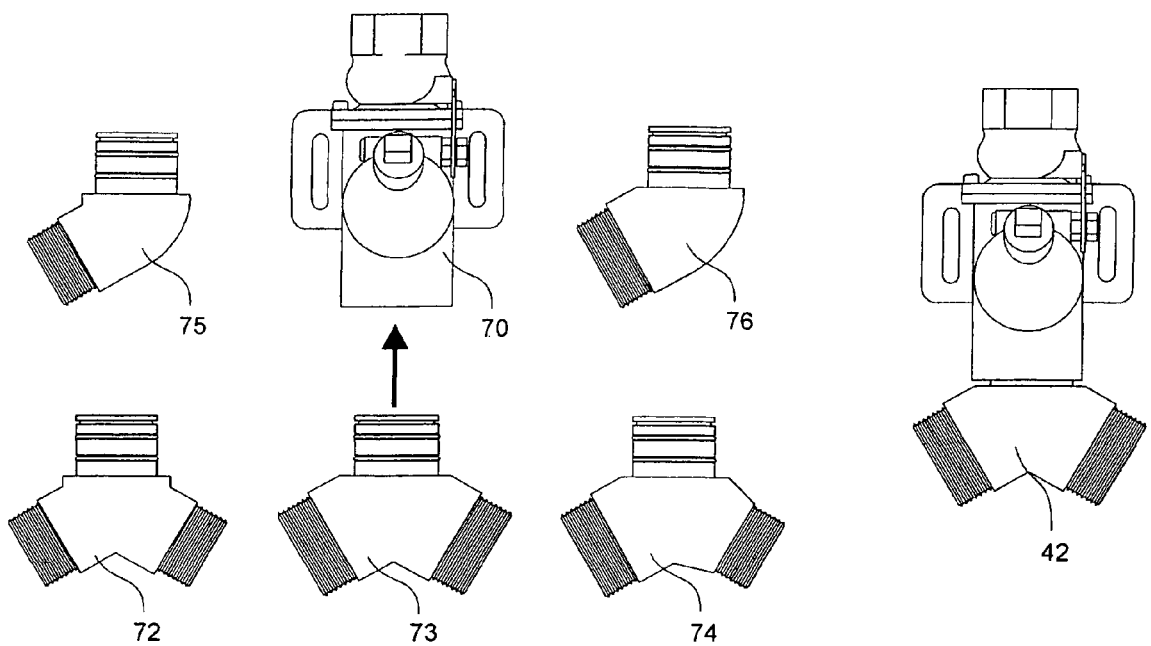
FIG. 13 is a side perspective view of a product shear valve and associated angled fitting adapters.
Figure 14:
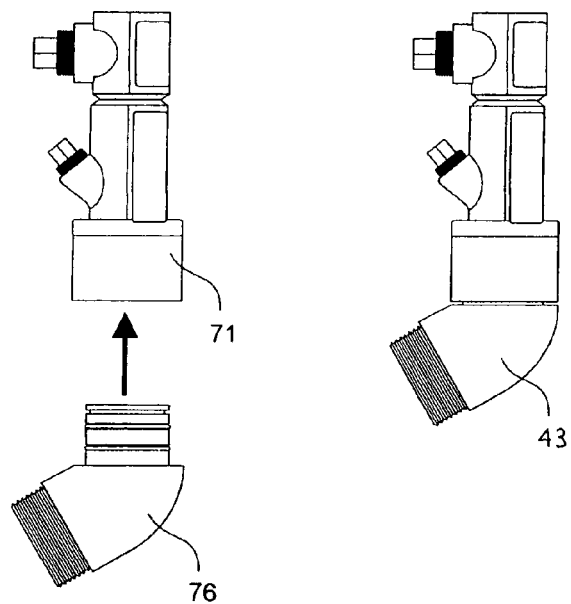
FIG. 14 is a side perspective view of a vapor shear valve and associated angled fitting adapter.

FIGS. 13 and 14 illustrate one method of manufacturing an angled shear valve 42 and a angled vapor valve 43. For manufacturing flexibility there would be one base product shear valve 70 having a variety fitting adapters. Illustrated in FIG. 13 are the various fitting adapters that would be common for use a product shear valve application. They are as follows: 1½"×1½" Y adapter 72; 2"×2" Y adapter 73; 2"×1½" Y adapter 74; FIG. 14 illustrates that a basic angled vapor valve 43 can be connected with a 1½" elbow adapter 76; and 2" elbow adapter (not shown).

One of the design considerations of this new invention was that all under-dispenser piping and plumbing connections had to be contained within the dispenser sumps. In an effort to improve accessibility to all primary and secondary piping connections the dispenser sump was made considerably more shallow compared to conventional deep dispenser sumps. In an effort to contain all primary and secondary piping and plumbing connections with this shallow dispenser container, the piping entries are made at an angle rather than horizontally. To minimize dispenser sump depth the riser pipes and associated directional fittings contained within the sump are eliminated. In order to eliminate the riser assembly the piping enters the sidewall of the dispenser container at such an angle that it can easily connect to a newly designed shear valve that has one or two angled pipe connection ports. By directly connecting the piping to this angled shear valve without the use of a riser pipe assembly, half of the piping joints are eliminated as well as the need for a deep dispenser container to contain it.

The invention incorporates an under-dispenser container that has angled sidewalls versus traditional vertical sidewalls. Conventional pipe entry seals may be used like those described in U.S. Pat. No. 5,722,699 to seal all primary and/or secondary pipe and conduit entries into the container. The only significant difference is that these entry seals would be installed perpendicular to the sidewall of an under-dispenser container that has angled instead of vertical sidewalls.

This newly designed under-dispenser containment sump can accommodate either rigid or flexible piping systems that may be routed via a branching or series method. Branch pipe routing describes a pipe routing method having a main pipeline with branch pipelines coming off the main and terminating within an under-dispenser container. Series pipe routing describes a pipe routing method where the main pipeline runs though one or more under-dispenser container and eventually terminates in the last under-dispenser container located at the end of the series piping-run. When the underground pipeline is run in series in this invention, it has a looping or "daisy chain" appearance where there would not be gradual piping fall from the above ground dispenser back to the tank.

The preferable method of piping as described in this invention is a double-wall flexible piping system run in a series routing method. The double-wall flexible piping system has double-wall pipe couplings like those described in my U.S. Pat. No. 5,713,607 and current patent pending applications. Additionally the double-wall piping may be installed in a larger chase as described in U.S. Pat. No. 4,971,477.

The benefits of the invention described below, is an under-dispenser container that has improved accessibility for connection of pipe entry boots and primary and secondary piping connections. This type of shallow containment sump secondarily contains all the under-dispenser piping and plumbing connections like that of conventional deep dispenser sumps. The shallow design provides for easy visual inspection and repair of the entire container, pipe entry seals and plumbing connections contained within. Additionally the shallow design with many angled sidewalls provide for a much stronger container that can resist wall bending, cracking or even collapse under high ground pressures. Used in conjunction with a chase, a flexible primary pipe section can be more easily removed and replaced than with conventional deep dispenser sumps. Elimination of riser pipe assemblies reduces the number of piping joints within the container by half, minimizing potential leak sources. Incorporation of double-wall pipe couplings connected to either single-wall or double-wall angled shear valves provides for double-wall piping all the way to the shear valve. The angled Y-type double-wall shear valves have test ports and isolation valves to isolate the interstitial space of a pipe section in order to make it easier to determine the location of a leak in a piping run (two or more connected pipe sections).

Another major benefit of this under-dispenser containment system is that it accommodates required fall or slope of the vapor recovery piping from under the above ground dispenser to the underground storage tank without the need for adjusting the height of the chamber. This allows the manufacturer to produce an under-dispenser containment system that requires little to no fabrication in the field, saving labor, costs and fabrication mistakes. Doing most of the fabrication and assembly in the factory minimizes the possibility of leaks and gives the manufacturer control of the integrity of the containment system. These pre-assembled or modular under-dispenser containment units could include the following components: a) under-dispenser sump assembly; b) Y or elbow shear valves mounted to the stabilizer bars; c) all pipe entry seals pre-installed in the sidewalls in their correct location to seal supply pipe, chase pipe, recovery pipe and conduit entries; d) a leak detection sensor can be mounted; e) an automatic fire extinguisher.

Even though particular embodiments of the present invention have been illustrated as described herein, it is not intended to limit the invention and changes and modifications may be made therein within the scope of the following claims.

What is claimed is:

1. An under-dispenser containment sump comprising:
    a chamber for disposition beneath a fuel dispenser, said chamber having an open upper end and a closed bottom wherein the open upper end is joined to said fuel dispenser at its base;
    said chamber further comprising one or more angular side walls, said one or more angular side walls comprising at least first and second segments between said closed bottom and said upper end, neither of which segments is perpendicular to said closed bottom,
    said first segment forming an oblique angle with reference to the bottom of the chamber, said angle being more than ninety degrees with reference to the bottom such that said first segment extends upward and outward from said bottom;
    said second segment extending upward and inward at an angle from said first segment, returning inward toward a vertical axis through the chamber at its geometric center,
    wherein said chamber includes a shear valve and an inlet port, and
    wherein the shear valve connects to the fuel dispenser, and the inlet port connects to the shear valve and is disposed to extend downward from the fuel dispenser and forms an obtuse angle relative to a longitudinal axis of the shear valve.

2. The under-dispenser containment sump of claim 1, wherein said one or more angular side walls further comprises:
    a third side wall segment extending upward from said second segment.

3. The under-dispenser containment sump of claim 1, wherein said chamber further comprises a chamber mounting frame for mounting said under-dispenser sump below the fuel dispenser.

4. The under-dispenser containment sump of claim 1, wherein said sump further comprises one or more pipe entry openings in said side walls.

5. The under-dispenser containment sump of claim 4, wherein said chamber further includes an outlet port, wherein the outlet port connects to the shear valve and is disposed to extend downward from the fuel dispenser and forms another obtuse angle relative to the longitudinal axis of the shear valve, and wherein the shear valve, the inlet port and the outlet port comprise a Y shear valve for connection to pipes penetrating said one or more pipe entry openings in said side walls.

6. The under-dispenser containment sump of claim 4, wherein the shear valve and inlet port comprise an elbow shear valve for connection to a pipe penetrating said one or more pipe entry openings in said side wall.

7. The under-dispenser containment sump of claim 1, wherein
    the depth of said sump is between about ten and twenty inches from said open upper end to said bottom.

8. An underground piping system connecting a dispensing pump of an underground storage tank to an above-ground dispensing unit, comprising:
    an originating chamber having a side wall, said originating chamber installed around the dispensing pump located at the beginning of an underground pipeline and having at least one opening in its side wall for pipe exit;
    a terminating chamber installed under the above-ground dispensing unit located at the end of the underground pipeline, providing a means of surface access, secondary containment, leak collection and having at least one opening in one of its side walls for pipe entry;
    said terminating chamber comprising an open upper end and a closed bottom wherein the open upper end is joined to the above-ground dispenser unit at its base;
    said terminating chamber further comprising one or more angular side walls, said one or more angular side walls comprising at least first and second segments between said closed bottom and said upper end, neither of which segments is perpendicular to said closed bottom;
    said first segment forming an oblique angle with reference to the bottom of the terminating chamber, said angle being more than ninety degrees with reference to the bottom such that said first segment extends upward and outward from said bottom;
    said second segment extending upward and inward at an angle from said first segment, returning inward toward a vertical axis through the terminating chamber at its geometric center,
    wherein said terminating chamber includes a shear valve and an inlet port,
    wherein the shear valve connects to the above-ground dispensing unit, and the inlet port connects to the shear valve and is disposed to extend downward from the above-ground dispensing unit and forms an obtuse angle relative to a longitudinal axis of the shear valve, and
    wherein the shear valve and the inlet port comprise an elbow shear valve, providing a direct piping interface for the above-ground dispensing unit and the terminating end of the underground pipeline that is contained within the terminating chamber.

9. The underground piping system of claim 8, wherein said one or more angular side walls further comprises:
    a third side wall segment extending upward from said second segment.

10. The underground piping system of claim 8, wherein said terminating chamber further comprises a chamber mounting frame for mounting said terminating chamber below the above-ground dispensing unit.

11. The underground piping system of claim 8, wherein said terminating chamber further comprises one or more pipe entry openings in said side walls.

12. The underground piping system of claim 11, wherein the shear valve and inlet port comprise an elbow shear valve for connection to a pipe penetrating said one or more pipe entry openings in said side wall.

13. The underground piping system of claim 8, wherein the depth of said terminating chamber is between about ten and twenty inches from said open upper end to said bottom.

14. An underground piping system which connects a dispensing pump of an underground storage tank to a plurality of above-ground dispensing units, comprising:

an originating chamber which is installed around the dispensing pump located at the beginning of an underground pipeline and having at least one opening in its side walls for pipe entry;

one or more junction chambers installed under the plurality of above-ground dispensing units supplied by the underground pipeline, providing a means of surface access, secondary containment, and leak collection, and having at least one opening in the side walls of each junction chamber for an underground pipe entry and at least one other opening for an underground pipe exit;

sealing devices providing a means for sealing all pipe entry and exit openings in the side walls of each junction chamber to the exterior wall of the underground pipe, whereby the pipe entry through each junction chamber is liquid tight;

wherein each junction chamber comprises:

an open upper end and a closed bottom wherein the open upper end is joined to said above-ground dispensing units at its base;

each junction chamber further comprising one or more angular side walls, said one or more angular side walls comprising at least first and second segments between said closed bottom and said upper end, neither of which segments is perpendicular to said closed bottom, said first segment forming an oblique angle with reference to the bottom of the junction chamber, said angle being more than ninety degrees with reference to the bottom such that said first segment extends upward and outward from said bottom;

said second segment extending upward and inward at an angle from said first segment, returning inward toward a vertical axis through the junction chamber at its geometric center, wherein said junction chamber includes a shear valve an inlet port, and an outlet port, wherein the shear valve connects to the above-ground dispensing unit, and the inlet port and the outlet port each connect to the shear valve and are disposed to extend downward from the above-ground dispensing unit and form an obtuse angle relative to a longitudinal axis of the shear valve.

15. The underground piping system of claim 14, wherein said one or more angular side walls of each junction chamber further comprises:

a third side wall segment extending upward from said second segment.

16. The underground piping system of claim 14, wherein each junction chamber further comprises a chamber mounting frame for mounting said junction chamber below the above-ground dispensing unit.

17. The underground piping system of claim 14, wherein each junction chamber further comprises one or more pipe entry openings in said side walls.

18. The underground piping system of claim 17, wherein the shear valve, the inlet port and the outlet port comprise a Y shear valve for connection to pipes penetrating said one or more pipe entry openings in said side walls.

19. The underground piping system of claim 14, wherein the depth of each junction chamber is between about ten and twenty inches from said open upper end to said bottom.

\* \* \* \* \*